United States Patent
Flaherty et al.

(10) Patent No.: US 6,257,589 B1
(45) Date of Patent: *Jul. 10, 2001

(54) AEROSPACE HOUSING AND SHAFT ASSEMBLY

(75) Inventors: Andrew L. Flaherty; Rainer F. Engelmann, both of Hoffman Estates, IL (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/328,349

(22) Filed: Jun. 8, 1999

Related U.S. Application Data

(63) Continuation of application No. 08/878,433, filed on Jun. 18, 1997, now Pat. No. 5,941,532.
(60) Provisional application No. 60/020,153, filed on Jun. 20, 1996.

(51) Int. Cl.[7] .............................. F16J 15/34; F16J 15/16
(52) U.S. Cl. ........................... 277/400; 277/404; 277/406
(58) Field of Search ................................... 277/400, 404, 277/406

(56) References Cited

U.S. PATENT DOCUMENTS

| | | | |
|---|---|---|---|
| Re. 34,319 | 7/1993 | Boutin et al. | 415/174.2 |
| 3,499,653 | 3/1970 | Gardner | 277/27 |
| 3,744,805 * | 7/1973 | Heinrich | 277/400 |
| 3,804,424 | 4/1974 | Gardner | 277/27 |
| 4,212,475 | 7/1980 | Sedy | 277/96.1 |
| 4,290,611 | 9/1981 | Sedy | 277/27 |
| 4,407,513 * | 10/1983 | Takenaka et al. | 277/400 |
| 4,423,879 * | 1/1984 | Takenake et al. | 277/400 |
| 4,768,790 | 9/1988 | Netzel et al. | 277/81 R |
| 4,836,561 | 6/1989 | Lebeck et al. | 277/93 SD |
| 4,884,945 | 12/1989 | Boutin et al. | 415/174.2 |
| 4,887,395 | 12/1989 | Lebeck et al. | 51/101 R |
| 4,889,348 | 12/1989 | Amundson et al. | 277/1 |
| 5,039,113 | 8/1991 | Gardner | 277/81 R |
| 5,054,938 | 10/1991 | Ide | 384/117 |
| 5,071,141 | 12/1991 | Lai et al. | 277/65 |
| 5,090,712 | 2/1992 | Pecht et al. | 277/96.1 |
| 5,143,384 | 9/1992 | Lipschitz | 277/96.1 |
| 5,169,159 | 12/1992 | Pope et al. | 277/27 |
| 5,172,918 | 12/1992 | Pecht et al. | 277/96.1 |
| 5,174,584 | 12/1992 | Lahrman | 277/74 |
| 5,199,172 | 4/1993 | Runowski | 29/898.11 |

(List continued on next page.)

FOREIGN PATENT DOCUMENTS

| | | | |
|---|---|---|---|
| 0369295 | 5/1990 | (EP) | 277/399 |
| 396441 * | 11/1990 | (EP) | 277/400 |

OTHER PUBLICATIONS

Pp. 145–151 of *Sprial Groove Bearings*, by E. A. Muijderman, N.V Philips' Gloeilampenfabrieken, Eindhoven, The Netherlands, 1966.

*Primary Examiner*—Anthony Knight
*Assistant Examiner*—Robert G. Santos
(74) *Attorney, Agent, or Firm*—Quarles & Brady LLP

(57) ABSTRACT

A seal assembly having a first seal ring of a generally annular shape and defining radial and circumferential directions, and a second seal ring positioned in facing relation to the first seal ring. One of the first seal ring and the second seal ring includes a plurality of hydropads. Each hydropad has an inner edge oriented substantially circumferentially, an outer edge oriented substantially circumferentially and spaced radially outward from the inner edge, a leading edge interconnecting the inner edge with the outer edge, and a trailing edge interconnecting the inner edge with the outer edge. Both the leading edge and the trailing edge are substantially straight and are positioned at the same angle relative to a radial axis passing through a mid-point of each edge, respectively.

16 Claims, 3 Drawing Sheets

U.S. PATENT DOCUMENTS

| | | | |
|---|---|---|---|
| 5,201,531 | 4/1993 | Lai | 277/96.1 |
| 5,215,385 | 6/1993 | Ide | 384/100 |
| 5,217,233 | 6/1993 | Pecht et al. | 277/65 |
| 5,222,743 | 6/1993 | Goldswain et al. | 277/96.1 |
| 5,224,714 | 7/1993 | Kimura et al. | 277/96.1 |
| 5,249,812 | 10/1993 | Volden et al. | 277/15 |
| 5,253,876 | 10/1993 | Gardner et al. | 277/15 |
| 5,281,032 | 1/1994 | Slocum | 384/118 |
| 5,312,117 * | 5/1994 | Takenaka et al. | 277/400 |
| 5,375,853 | 12/1994 | Wasser et al. | 277/59 |
| 5,375,855 | 12/1994 | Goldswain et al. | 277/96.1 |
| 5,385,409 | 1/1995 | Ide | 384/124 |
| 5,399,024 | 3/1995 | Shapiro | 384/124 |
| 5,441,283 | 8/1995 | Pecht et al. | 277/96.1 |
| 5,454,572 | 10/1995 | Pospisil | 277/65 |
| 5,490,679 | 2/1996 | Borrino et al. | 277/65 |
| 5,492,341 | 2/1996 | Pecht et al. | 277/96.1 |
| 5,496,047 | 3/1996 | Goldswain et al. | 277/96.1 |
| 5,529,315 | 6/1996 | Borrino et al. | 277/65 |
| 5,538,260 * | 7/1996 | Takenaka et al. | 277/400 |
| 5,605,339 | 2/1997 | Pecht et al. | 277/96.1 |
| 5,941,532 * | 8/1999 | Flaherty et al. | 277/400 |
| 6,142,478 * | 11/2000 | Pecht et al. | 277/400 |

* cited by examiner

AEROSPACE HOUSING AND SHAFT ASSEMBLY

CROSS REFERENCES TO RELATED APPLICATIONS

This application is a Continuation of U.S. patent application Ser. No. 08/878,433 filed on Jun. 18, 1997, and issued as U.S. Pat. No. 5,941,532 on Aug. 24, 1999, which claims the benefit of U.S. Provisional Patent Application No. 60/020,153 filed on Jun. 20, 1996.

FIELD OF THE INVENTION

The present invention generally relates to the field of aerospace housing and shaft assemblies, and more specifically to seals for providing a barrier between a housing and a shaft in an aerospace application.

BACKGROUND OF THE INVENTION

Mechanical face seals are commonly used to provide a seal between a stationary housing and a rotating shaft. Such seals include a rotating ring mounted on the shaft and a stationary ring mounted on the housing. Either the stator or the rotor is biased toward the other to provide a biased seal therebetween.

A typical seal design for inhibiting process fluid, whether liquid or gas, from escaping from a housing along a rotating shaft includes two seals in fluid communication with an intermediate chamber containing a buffer fluid. One seal pumps the buffer fluid having a certain pressure across the seal between a stator and rotator into the housing containing the process fluid. The process fluid in the housing has a lower pressure than the buffer fluid in the intermediate chamber. The other seal pumps the buffer fluid to an environment external to the housing, such as ambient, which is at a pressure lower than the buffer fluid in the intermediate chamber.

To accomplish this pumping, each seal includes spiral grooves on either the face of the stator or rotor. The grooves are angled relative to the radius and circumference of the rotating shaft, and when the rotator is rotating, the grooves pump the buffer fluid across the seal. This pumping of the high-pressure buffer fluid toward the lower-pressure external environment or process fluid inhibits the loss of the process fluid from the housing. U.S. Pat. No. 5,375,853 discloses a seal design of this type.

In another design, grooved face seals are used in pumps to provide a seal between a high-pressure gas (e.g., a combustible gas) and the ambient atmosphere. In this situation, two seals are commonly used. A grooved inner seal pumps the high pressure gas to an intermediate chamber, and a grooved outer seal pumps from the intermediate chamber to the atmosphere. The intermediate chamber routes the high-pressure gas to a flare stack where the pumped gas is burned. The amount of high-pressure gas that is lost through the outer seal is thereby minimized. An example of this type of seal is disclosed in U.S. Pat. No. 5,217,233.

SUMMARY OF THE INVENTION

The present invention recognizes that grooved face seals are useful in applications other than in a fluid pump. For example, it has been discovered that grooved face seals provide significant benefits in terms of reduced heat generation and longer seal life when used in aerospace applications, such as on gear boxes, starters, constant speed drives and integrated drive generators. In fact, in some situations, significant benefits can be achieved by using grooved face seals to replace existing non-grooved seals. Surprisingly, this also has been found to work in situations where the seal is exposed to atmospheric pressures substantially less than 14.7 psia, such as when the seal is being used in an aerospace application (e.g., an aircraft) at altitude. In addition, the present invention has discovered a cost-effective method for forming the grooves on the seal rings, thereby making the grooved seals applicable to a larger number of applications where cost may be an issue. Furthermore, a unique and simple hydropad configuration has been developed.

In one aspect, the present invention provides an aerospace housing and shaft assembly comprising a housing, a shaft rotatably mounted within the housing, a seal assembly operatively positioned between the housing and the shaft, and low pressure air (e.g., atmospheric air) having a pressure substantially less than 14 psia and being positioned on one side of the seal assembly. The seal assembly includes a first seal ring mounted on the housing, and a second seal ring mounted on the shaft in facing relation to the first seal ring. One of the first seal ring and the second seal ring includes a hydropad. Preferably, the hydropad is positioned to pump from the inner diameter toward the outer diameter. For example, the low-pressure air can be positioned on the inner diameter of the seal assembly, in which case the hydropad would pump the low-pressure air. In a preferred embodiment, the low-pressure air has a pressure less than about 10 psia, and more preferably less than about 5 psia.

The present invention also provides a method of producing a seal assembly having a seal ring. The method comprises the steps of positioning the seal ring in alignment with a media blaster, placing a template between the seal ring and the media blaster, and forcing media from the media blaster, through the openings in the template, and into contact with the seal ring. The seal ring can then be mounted in a seal assembly. In one embodiment, ceramic beads are used as the blast media. The positioning step can include the step of mounting the seal ring on a holder. Preferably the holder is rotated while the media is being forced at the seal ring. To obtain better results, a timer can be used to insure that the blast time is consistent.

The present invention also recognizes that hydropads do not need to be spiral in shape. More specifically, the hydropads can include an inner edge oriented substantially circumferentially, an outer edge oriented substantially circumferentially and spaced radially outward from the inner edge, a leading edge interconnecting the inner edge with the outer edge, and a trailing edge interconnecting the inner edge with the outer edge. Both the leading edge and the trailing edge are substantially straight and oblique to a radial direction. Preferably, to simplify the design, the inner edge and the outer edge are also both substantially straight. In one embodiment, the leading edge is positioned at an angle relative to the radial direction passing through a mid-point of the leading edge, and the trailing edge is positioned at the same angle relative to the radial direction passing through a mid-point of the trailing edge.

A more detailed description of a specific embodiment of the present invention is illustrated and described below.

DETAILED DESCRIPTION

Figure 1:
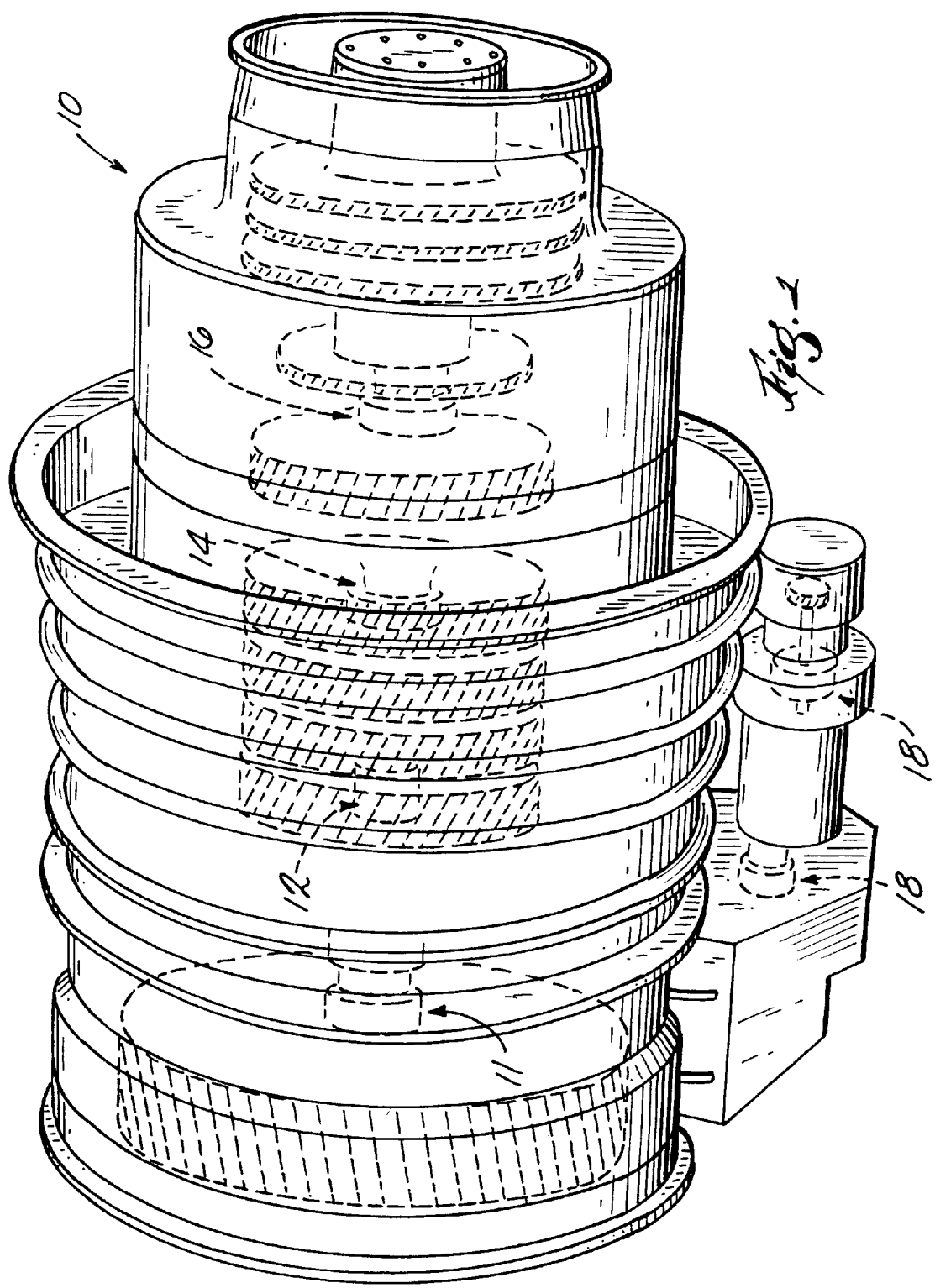
FIG. 1 illustrates the use of hydropad seals in various applications in a gas turbine engine.

FIG. 1 illustrates the use of hydropad seals in an aerospace gas turbine engine 10. It has been discovered that hydropad seals can be used in a variety of positions within the engine 10, and can be used to replace standard (non-hydropad) seals. In FIG. 1, the engine 10 employs use of the hydropad seals as compressor inlet seals 11, compressor/drive seals 12, interstage seals 14, turbine seals 16, and gearbox seals 18. Uses also include accessory seals such as constant speed drives, alternators, starters, generators, de-oilers, fuel pumps, hydraulic pumps, gearboxes, main shafts and fuel control seals (not shown). Hydropad seals provide virtually leakage free operations at temperatures ranging up to about 600 degrees Fahrenheit. The hydropad seals operate with a shaft speed up to 120,000 rpm for small sizes, and can be designed to handle reverse pressures. The hydropad seals can also operate in virtually any fluid, liquid or gas.

Figure 2:
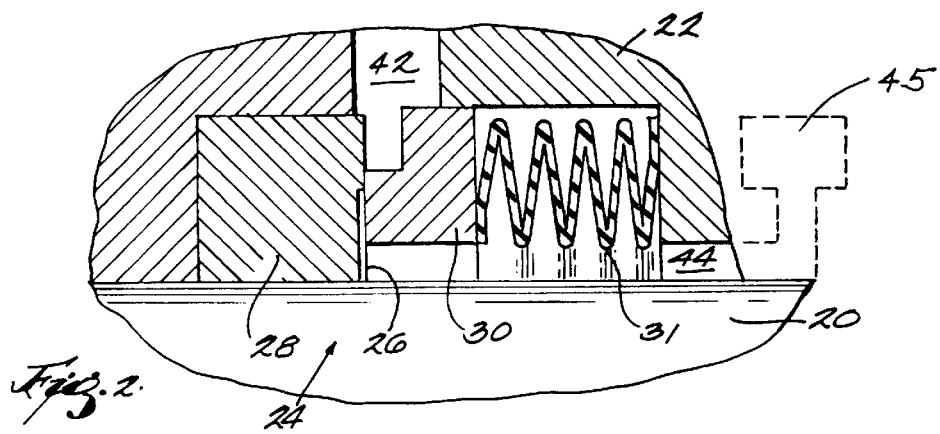
FIG. 2 is a partial cross-section of a rotating shaft positioned in a stationary housing.

FIG. 2 illustrates a cross-section of a rotating shaft 20 positioned within a stationary housing 22, and a seal assembly 24 mounted therebetween. The seal assembly 24 includes two seal rings: a mating ring 28 mounted on the shaft 20 and a seal nose 30 mounted on the housing 22. A hydropad 26 is formed on the mating ring 28. The mating ring 28 is typically a ductile material, such as hardened steel, but instead can be composed of tungsten carbide or silicon carbide, or can be steel with a ceramic coating.

Figure 3:
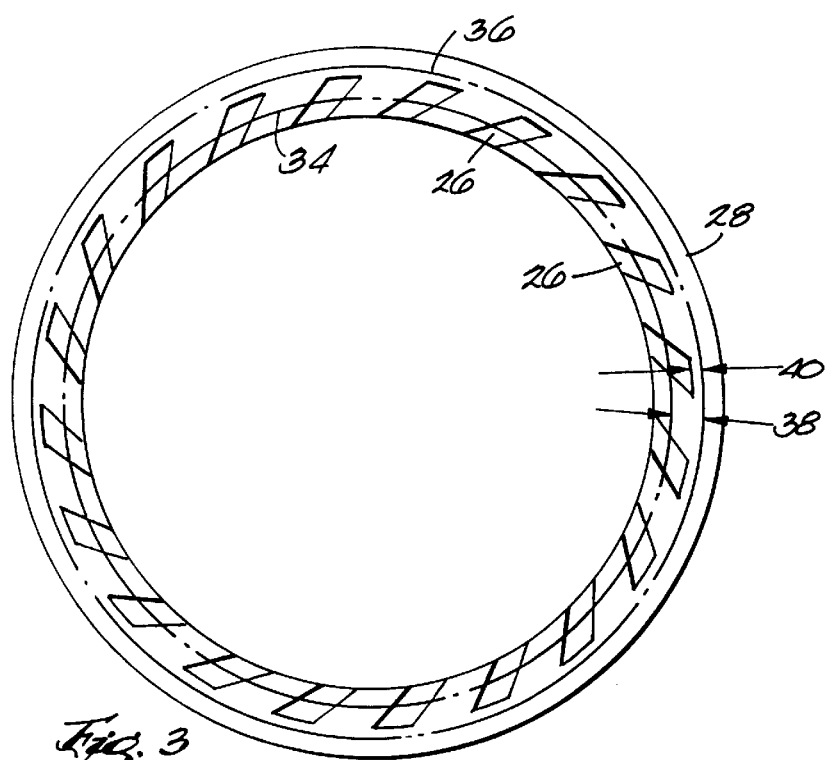
FIG. 3 illustrates a front view of a mating ring having hydropads.

FIG. 3 illustrates a front view of the mating ring 28 having a plurality of hydropads 26. The dashed lines represent an inner circumference 34 and an outer circumference 36 which define the position of the seal nose 30 relative to the hydropads 26, generally called a sealing interface area 38. As illustrated in FIG. 3, the hydropads 26 overlap the inner circumference 34 of the sealing interface area 38 on the mating ring 28. A sealing dam region 40 defines the region from the outer circumference 36 of the sealing interface area 38 to the outer edge of the hydropad 26.

In FIG. 2, a metal bellows 32 is positioned between the housing 22 and a seal nose 30, and allows for axial movement of the seal nose 30. When the shaft 20 is not rotating, the mating ring 28 contacts the seal nose 30 at the sealing interface area 38. A working fluid 42 (e.g., oil) is present outside (i.e., on the outer diameter of) the mating ring 28. Air 44 is positioned on the inner diameter of the seal. The air can be filtered by a filter 45 as schematically shown. The air 44 is preferably at atmospheric pressure, which is substantially less than 14.7 psia (standard absolute pressure at sea level) in the case of an aircraft flying at altitude. As used herein, the phrase "substantially less than 14.7 psia" means that the atmospheric air is what would be experienced by an aircraft flying at altitude. The seal of the present invention has been successfully tested to pressures of about 2 psia.

When the shaft 20 is rotating, the hydropads 26 force the air 44 between the mating ring 28 and the seal nose 30 to thereby cause a small gap to develop between the sealing interface area 38 and the seal nose 30. As the air 44 is pressurized, a barrier is created inhibiting working fluid 42 from passing through the sealing interface area 38. When the shaft 20 is not rotating, the sealing dam region 40 seals the working fluid 42 on the outside of outer circumference 36 of the sealing interface area 38. Because the hydropads 26 do not extend across the entire top surface of mating ring 28, the separation of the lubricating fluid region 38 from the air region 44 is accomplished.

Although the present embodiment illustrates a mating ring 28 rotating within the stationary housing 22, it is also possible for the stationary housing 22 to rotate with the mating ring 28 in a fixed position.

Figure 4:
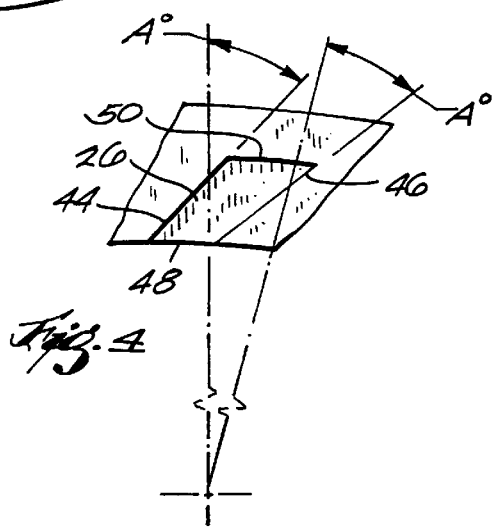
FIG. 4 is an enlarged view of a hydropad.

FIG. 4 is an enlarged view of a hydropad 26. The configuration of the hydropad 26 is such that a leading edge 44 and a trailing edge 46 diverge radially outwardly and are positioned at a constant angle relative to their respective radial axes. An inner edge 48 and an outer edge 50 are substantially straight and connect edges 44 and 46. In an alternate hydropad configuration, the inner edge 48 and outer edge 50 can be curved with a center of rotation positioned toward the center of the mating ring.

The required depth of the hydropad 26 varies depending upon the application. The illustrated hydropads 26 consist of many shallow grooves at a given depth of approximately 0.0001 inches to 0.0025 inches, and at a fixed angle about the inner diameter of the sealing face. The depth, number of grooves and angle of the paths are fixed at fixed values and are chosen to meet the given operating conditions as necessary.

Figure 5:
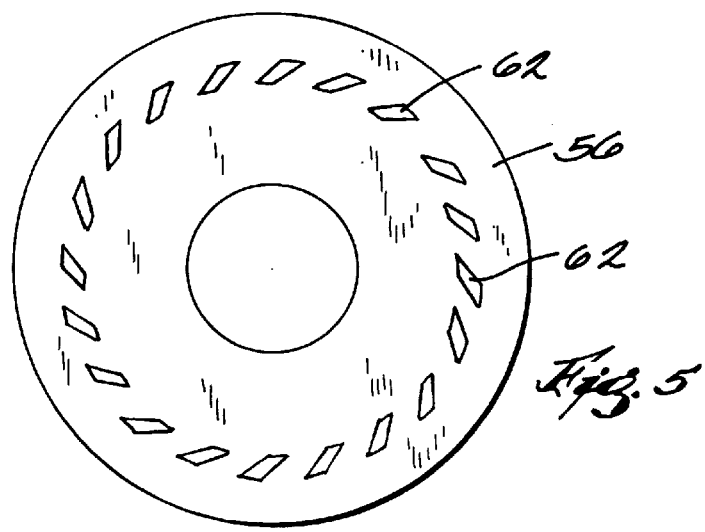
FIG. 5 is a front view of a template used to form the hydropads on a mating ring.
Figure 6:
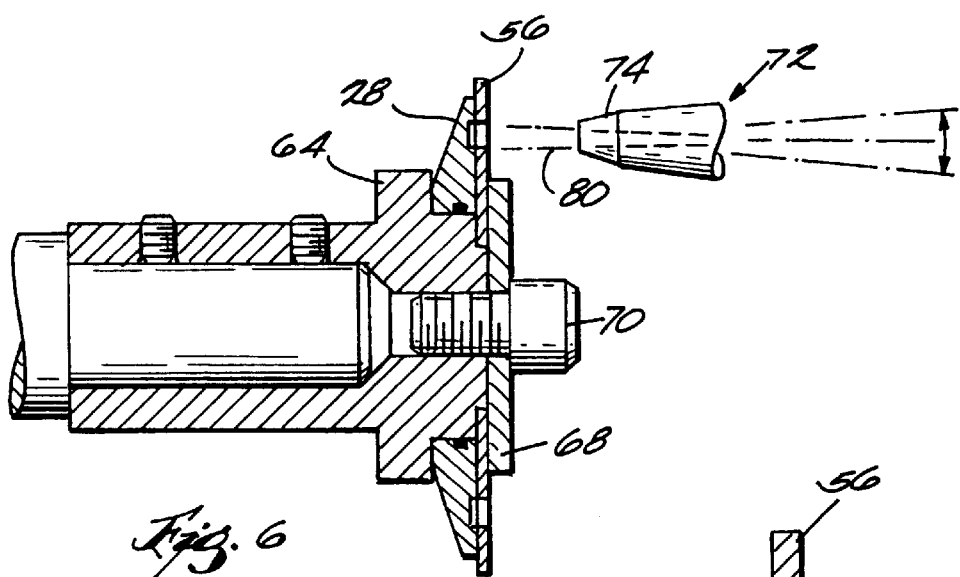
FIG. 6 illustrates a partial cross section of a mating ring holder and blasting assembly.
Figure 7:
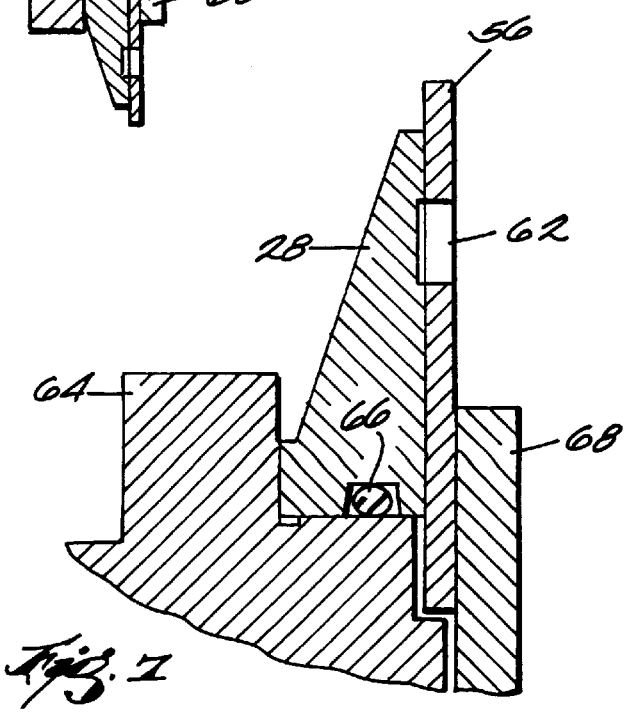
FIG. 7 is an enlarged section of the mating ring holder.

A method of forming a hydropad on a mating ring is also described, and is most clearly illustrated by FIGS. 5–7. The method utilizes a media blasting technique to form the hydropads 26 on the mating ring 28. FIG. 5 is a front view of the template 56 that is positioned over the front face of the mating ring 28 during the blasting procedure. Hydropad openings 62 are positioned in the size and orientation necessary to form the desired hydropads 26.

FIGS. 6 and 7 illustrate a mating ring holder 64 with a mating ring 28 positioned thereon. It is desirable to minimize the radial clearance between the mating ring 28 and the holder 64. To facilitate this, o-rings 66 may be used to help center the mating ring 28 onto the holder 64. The template 56 is positioned over the face of the mating ring 28, and a clamping plate 68 and fastener 70 are used to secure the template 56 and mating ring 28 to the holder 64. The hydropad openings 62 on the template 56 are utilized to define the areas for the formation of the hydropads 26.

The mating ring holder 64 is positioned adjacent to a nozzle 74 of a media blaster 72 that is aligned toward the openings 62 in template 56. The mating ring holder 64 positions the mating ring 28 and the template 56 a fixed and known distance from the nozzle 74. The vertical and horizontal positioning of the gun assembly 72 is preset prior to the starting of blasting. A media stream 80 projecting a bead blast from the nozzle 74 is directed such that the media stream 80 impacts midway between the inner edge 48 and outer edge 50 of the hydropads 26.

The media stream 80 can be composed of a variety of abrasive or peening materials, such as aluminum oxide or glass beads. It has been found that the use of ceramic beads is particularly advantageous since a more uniform result is achieved. It is believed that the use of ceramic beads results in a high amount of peening, as opposed to material removal. Peening reduces the amount of removed material being recirculated and blasted, and thus is believed to improve the consistency of the blasting operation. In addition, it is believed that peening results in fewer sharp peaks on the blasted part. Alternatively, the media can comprise a water slurry or air slurry or any other suitable material that can be blasted at the seal ring to cause formation of the hydropads, whether by material removal or material compression.

The axial positioning of the nozzle 74 is preset prior to the starting of the blasting operation. The bead blast pressure of the media stream 80 is also preset prior to starting of the blasting operation. Also, the mating ring 28 begins rotation before the bead blasting operation is started. The media blaster 72 is turned on simultaneously with a timer (not shown) which is used to indicate when the media blaster 72 is to be turned off. This method provides the greatest number of uniform mating ring hydropad depths.

The media blaster 72 can be rotated to direct the media stream 80 at an end of the template cutout holes 62 that form the hydropads 26. More specifically, once the vertical, horizontal and axial locations are fixed, the nozzle 74 can be rotated such that the media stream 80 is directed at the outer edge of the openings 62. The nozzle 74 can then be rotated to direct the media stream 80 at the inner edge of the openings 62. It is contemplated that the gun assembly 72 can be set to rotate in many directions, as necessary for the particular application.

When the bead blasting operation is complete, the template 56 is unclamped from clamping plate 68, and the mating ring 28 is removed. The clamping or staging surface of the fixture is then cleaned of bead media 80 prior to the installation of the next mating ring 28.

In order to obtain the correct depth of the hydropad 26, a polishing or lapping operation after bead blasting may be required. These operations truncate rough peaks of the bead blasted surface in the hydropad 26 and may dub edges of the hydropads. The actual depth of the hydropad 26 is better controlled by either changing the blasting time, the pressure or the distance of the gun assembly 72 from the mating ring 28.

In determining the proper bead blasting settings prior to bead blasting, a set-up piece is used. Periodic monitoring of hydropad depths is recommended to ensure consistency.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A seal assembly comprising:
   a first seal ring of a generally annular shape and defining radial and circumferential directions; and
   a rotatably mounted second seal ring positioned in facing relation to said first seal ring to define an interface therebetween, wherein one of said first seal ring and second seal ring includes a plurality of hydropads, said hydropads each including:
   an inner edge oriented substantially circumferentially;
   an outer edge oriented substantially circumferentially and spaced radially outward from said inner edge;
   a leading edge interconnecting said inner edge with said outer edge, said leading edge being substantially straight and positioned at an angle relative to a radial axis passing through a mid-point of said leading edge; and
   a trailing edge interconnecting said inner edge with said outer edge, said trailing edge being substantially straight and positioned at the same angle relative to a radial axis passing through a mid-point of said trailing edge,
   wherein said one of said first seal ring and second seal ring is positioned to overlap an edge of said interface such that said hydropads are exposed to air in a first region having a first pressure, and rotation of said second seal ring with respect to said first seal ring pumps air into said interface from said first region toward a second region having a second pressure no less than said first pressure thereby substantially preventing penetration of fluid disposed in said second region through said interface.

2. A seal assembly as claimed in claim 1, wherein said inner edge and said outer edge are both substantially straight.

3. A seal assembly as claimed in claim 1, wherein said hydropads are positioned to pump air from an inner diameter of said seal assembly toward an outer diameter of said seal assembly.

4. A seal assembly as claimed in claim 1, wherein said second seal ring comprises a ductile metallic material.

5. A seal assembly as claimed in claim 4, wherein said first seal ring comprises a carbon material.

6. A seal assembly as claimed in claim 1, wherein said hydropads include at least one groove having a depth approximately equal to or less than 0.0025 inches.

7. A seal assembly as claimed in claim 1, wherein said hydropads include at least one groove having a depth approximately equal to or less than 0.0001.

8. A seal assembly comprising:
   a first seal ring of a generally annular shape and defining radial and circumferential directions; and
   a rotatable mounted second seal ring positioned in facing relation to said first seal ring to define an interface therebetween, wherein one of said first seal ring and second seal ring includes a plurality of hydropads, wherein an interface is defined between said first seal ring and said second seal ring, said hydropads being positioned to overlap an edge of said interface such that said hydropads are exposed to a first fluid in a first region having a first pressure, and rotation of said second seal ring with respect to said first seal ring pumps said first fluid into said interface toward a second region having a second pressure no less than said first pressure thereby substantially preventing penetration of a second fluid disposed in said second region through said interface.

9. A seal assembly as claimed in claim 8, in which each hydropad includes
   an inner edge oriented substantially circumferentially;
   an outer edge oriented substantially circumferentially and spaced radially outward from said inner edge;
   a leading edge interconnecting said inner edge with said outer edge, said leading edge being substantially straight and positioned at an angle relative to a radial axis passing through a mid-point of said leading edge; and
   a trailing edge interconnecting said inner edge with said outer edge, said trailing edge being substantially straight and positioned at the same angle relative to a radial axis passing through a mid-point of said trailing edge.

10. A seal assembly as claimed in claim 9, wherein said inner edge and said outer edge are both substantially straight.

11. A seal assembly as claimed in claim 9, wherein said hydropads are positioned to pump said first fluid from an inner diameter of said seal assembly toward an outer diameter of said seal assembly.

12. A seal assembly as claimed in claim 8, wherein said second seal ring comprises a ductile metallic material.

13. A seal assembly as claimed in claim 12, wherein said first seal ring comprises a carbon material.

14. A seal assembly as claimed in claim 8, wherein said hydropads include at least one groove having a depth approximately equal to or less than 0.0025 inches.

15. A seal assembly as claimed in claim 8, wherein said hydropads include at least one groove having a depth approximately equal to or less than 0.0001.

16. A seal assembly as claimed in claim 8 in which said first fluid is air.

* * * * *